US012779591B2

(12) United States Patent
Kikkawa et al.

(10) Patent No.: US 12,779,591 B2
(45) Date of Patent: Nov. 3, 2026

(54) LASER PROCESSING METHOD, LASER PROCESSING MACHINE, AND PROCESSING PROGRAM CREATION DEVICE

(71) Applicant: AMADA CO., LTD., Kanagawa (JP)

(72) Inventors: Noboru Kikkawa, Kanagawa (JP); Takuya Murakami, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 847 days.

(21) Appl. No.: 18/036,278

(22) PCT Filed: Nov. 16, 2021

(86) PCT No.: PCT/JP2021/042121

§ 371 (c)(1),
(2) Date: May 10, 2023

(87) PCT Pub. No.: WO2022/113833

PCT Pub. Date: Jun. 2, 2022

(65) Prior Publication Data

US 2023/0398637 A1 Dec. 14, 2023

(30) Foreign Application Priority Data

Nov. 27, 2020 (JP) ................................ 2020-196669

(51) Int. Cl.
*B23K 26/38* (2014.01)
*B23K 101/18* (2006.01)

(52) U.S. Cl.
CPC .......... *B23K 26/38* (2013.01); *B23K 2101/18* (2018.08)

(58) Field of Classification Search
CPC ................ B23K 37/0235; B23K 26/38; B23K 26/0884; B23K 37/0408; B23K 26/388; B23K 2101/18
See application file for complete search history.

(56) References Cited

FOREIGN PATENT DOCUMENTS

JP 2015-100828 A 6/2015
JP 2016-78063 A 5/2016

OTHER PUBLICATIONS

Extended European Search report for corresponding EP Application No. 21897807.0 issued May 24, 2024.
International Search Report for corresponding Application No. PCT/JP2021/042121, mailed Jan. 11, 2022.
Written Opinion for corresponding Application No. PCT/JP2021/042121, mailed Jan. 11, 2022.

*Primary Examiner* — Elizabeth M Kerr
*Assistant Examiner* — Kuangyue Chen
(74) *Attorney, Agent, or Firm* — Renner, Otto, Boisselle & Sklar, LLP

(57) ABSTRACT

At least one dividing line formed of a straight line is set in a hole forming region surrounded by a hole processing line. It is determined whether or not a smaller one of connection angles at a first connecting point at which the dividing line is connected to a hole processing line is smaller than a predetermined angle. When the connection angle is smaller than the predetermined angle, a line segment between an auxiliary line and the hole processing line is replaced with corrected dividing line. A corrected connection angle at a second connecting point at which the corrected dividing line is connected to the hole processing line is set so as to be larger than a connection angle before correction.

3 Claims, 10 Drawing Sheets

LASER PROCESSING METHOD, LASER PROCESSING MACHINE, AND PROCESSING PROGRAM CREATION DEVICE

TECHNICAL FIELD

The present disclosure relates to a laser processing method, a laser processing machine, and a processing program creation device.

BACKGROUND ART

The laser processing machine irradiates, with a laser beam, a sheet metal mounted on a table on which a plurality of skids are arranged so as to cut the sheet metal, and manufactures a part having a predetermined shape. If the part has a hole formed inside, the laser processing machine cuts a periphery of a hole forming region in which the hole is formed, and then cuts a periphery of the part. A portion that should be cut and removed from the part is referred to as a scrap.

When the hole formed in the sheet metal is large, the scrap may not fall downward from between the skids, and the scrap that does not fall may rise and interfere with a processing head. Therefore, in order to prevent the scrap from rising and to cause the scrap to fall, the laser processing machine divides the hole forming region into a plurality of small scraps when forming a hole having a predetermined size or more (see Patent Literature 1 or 2).

CITATION LIST

Patent Literature

Patent Literature 1: Japanese Patent Application Laid-Open Publication No. 2015-100828

Patent Literature 2: Japanese Patent Application Laid-Open Publication No. 2016-78063

SUMMARY

The laser processing machine cuts the hole forming region along a dividing line set in the hole forming region, and then cuts the sheet metal along a hole processing line that is the periphery of the hole forming region. At this time, if an angle formed by the dividing line and the hole processing line or an angle formed by the dividing line and a tangent line of the hole processing line at a connecting point at which the dividing line is connected to the hole processing line is small, a phenomenon referred to as burning, in which a metal is excessively molten in a vicinity of the connecting point, may occur.

If the burning occurs in the vicinity of the connecting point, a processing defect may occur in which the scrap does not fall. This occurs because the excessively molten metal spreads due to an assist gas, and the scrap that should be cut is not cut. It is desired to introduce a laser processing method, a laser processing machine, and a processing program creation device capable of forming a dividing line that suppresses an occurrence of a processing defect and capable of processing a sheet metal when a part having a hole inside is manufactured.

According to a first aspect of one or more embodiments, a laser processing method is provided, which includes setting at least one dividing line formed of a straight line in a hole forming region around which a hole processing line for forming a hole in a part manufactured by cutting a sheet metal is set so that the hole forming region is surrounded by the hole processing line, defining, as a connection angle of the dividing line, an angle formed by the dividing line and the hole processing line at a first connecting point at which the dividing line is connected to the hole processing line or an angle formed by the dividing line and a tangent line of the hole processing line at the first connecting point, and defining a smaller connection angle of two connection angles on both sides of the dividing line as a connection angle to be determined, so as to determine whether or not the connection angle to be determined is smaller than a predetermined angle, correcting the dividing line, when the connection angle to be determined is smaller than the predetermined angle, such that a line segment, of the dividing line, between an auxiliary line, which is obtained by offsetting inward the hole processing line by a predetermined distance and is set in the hole forming region, and the hole processing line is replaced with a corrected dividing line formed of a straight line or a curve from a position at which the dividing line intersects with the auxiliary line to a second connecting point connected to the hole processing line that is different from the first connecting point, defining, as a connection angle of the corrected dividing line, an angle formed by the corrected dividing line and the hole processing line at the second connecting point or an angle formed by the corrected dividing line and a tangent line of the hole processing line at the second connecting point, and defining, as a corrected connection angle, an connection angle on a same side as the connection angle to be determined of two connection angles on both sides of the corrected dividing line, so as to set the corrected dividing line such that the corrected connection angle is larger than the connection angle to be determined, and performing irradiation of a laser beam along at least one dividing line including at least the corrected dividing line so as to divide the hole forming region into a plurality of scraps and performing irradiation of the laser beam along the hole processing line so as to cut the hole forming region and to form the hole on the sheet metal.

According to a second aspect of the one or more embodiments, a laser processing machine is provided, which includes a processing machine main body configured to irradiate a sheet metal with a laser beam so as to cut the sheet metal, and a control device configured to control the processing machine main body such that the processing machine main body cuts the sheet metal to manufacture a part, in which the control device is configured, when a hole is formed by cutting a hole processing line set for forming the hole in the part after dividing, into a plurality of scraps, a hole forming region surrounded by the hole processing line, to define, as a connection angle of at least one dividing line for dividing the hole forming region, an angle formed by the dividing line and the hole processing line at a connecting point at which the dividing line is connected to the hole processing line or an angle formed by the dividing line and a tangent line of the hole processing line at the connecting point, and to control the processing machine main body so as to divide the hole forming region by a dividing line bent at a position at which the dividing line intersects with an auxiliary line, which is obtained by offsetting inward the hole processing line and set in the hole forming region, such that a smaller connection angle of two connection angles on both sides of the dividing line is equal to or larger than a predetermined angle.

According to a third aspect of the one or more embodiments, a processing program creation device is provided, which includes a hole division necessity determination unit configured to determine whether or not it is necessary to divide, by a dividing line, a hole forming region surrounded by a hole processing line set for forming a hole, based on part graphic data indicating a part having a hole, a dividing line setting unit configured to set at least one dividing line in the hole forming region when it is determined by the hole division necessity determination unit that it is necessary to divide the hole forming region by the dividing line, a dividing line correction necessity determination unit configured to define, as a connection angle of the dividing line, an angle formed by the dividing line and the hole processing line at a first connecting point at which the dividing line is connected to the hole processing line or an angle formed by the dividing line and a tangent line of the hole processing line at the first connecting point, and to define, as a connection angle to be determined, a smaller connection angle of two connection angles on both sides of the dividing line, so as to determine whether or not the connection angle to be determined is smaller than a predetermined angle, and a dividing line correction unit configured to correct the dividing line, when it is determined by the dividing line correction necessity determination unit that the connection angle to be determined is smaller than the predetermined angle, such that a line segment, of the dividing line, between an auxiliary line, which is obtained by offsetting inward the hole processing line by a predetermined distance and is set in the hole forming region, and the hole processing line is replaced with a corrected dividing line formed of a straight line or a curve from a position at which the dividing line intersects with the auxiliary line to a second connecting point connected to the hole processing line that is different from the first connecting point.

In the processing program creation device having the above configuration, the dividing line correction unit is configured to define, as a connection angle of the corrected dividing line, an angle formed by the corrected dividing line and the hole processing line at the second connecting point or an angle formed by the corrected dividing line and a tangent line of the hole processing line at the second connecting point, and to define, as a corrected connection angle, an connection angle on a same side as the connection angle to be determined of two connection angles on both sides of the corrected dividing line, so as to set the corrected dividing line such that the corrected connection angle is larger than the connection angle to be determined.

The processing program creation device having the above configuration further includes a cutting path setting unit configured to lay out a cutting path of the dividing line in the hole forming region based on the part graphic data and the dividing line set by the dividing line correction unit, and to lay out a cutting path for forming a hole in the hole processing line, and an NC data creation unit configured to create NC data for controlling a laser processing machine so as to manufacture the part by cutting a sheet metal based on the cutting path set by the cutting path setting unit.

According to the laser processing method, the laser processing machine, and the processing program creation device of the one or more embodiments, it is possible to form a dividing line that suppresses an occurrence of a processing defect in processing a sheet metal when a part having a hole inside is manufactured.

DESCRIPTION OF EMBODIMENTS

Hereinafter, a laser processing method, a laser processing machine, and a processing program creation device of one or more embodiments will be described with reference to the attached drawings.

Figure 1:
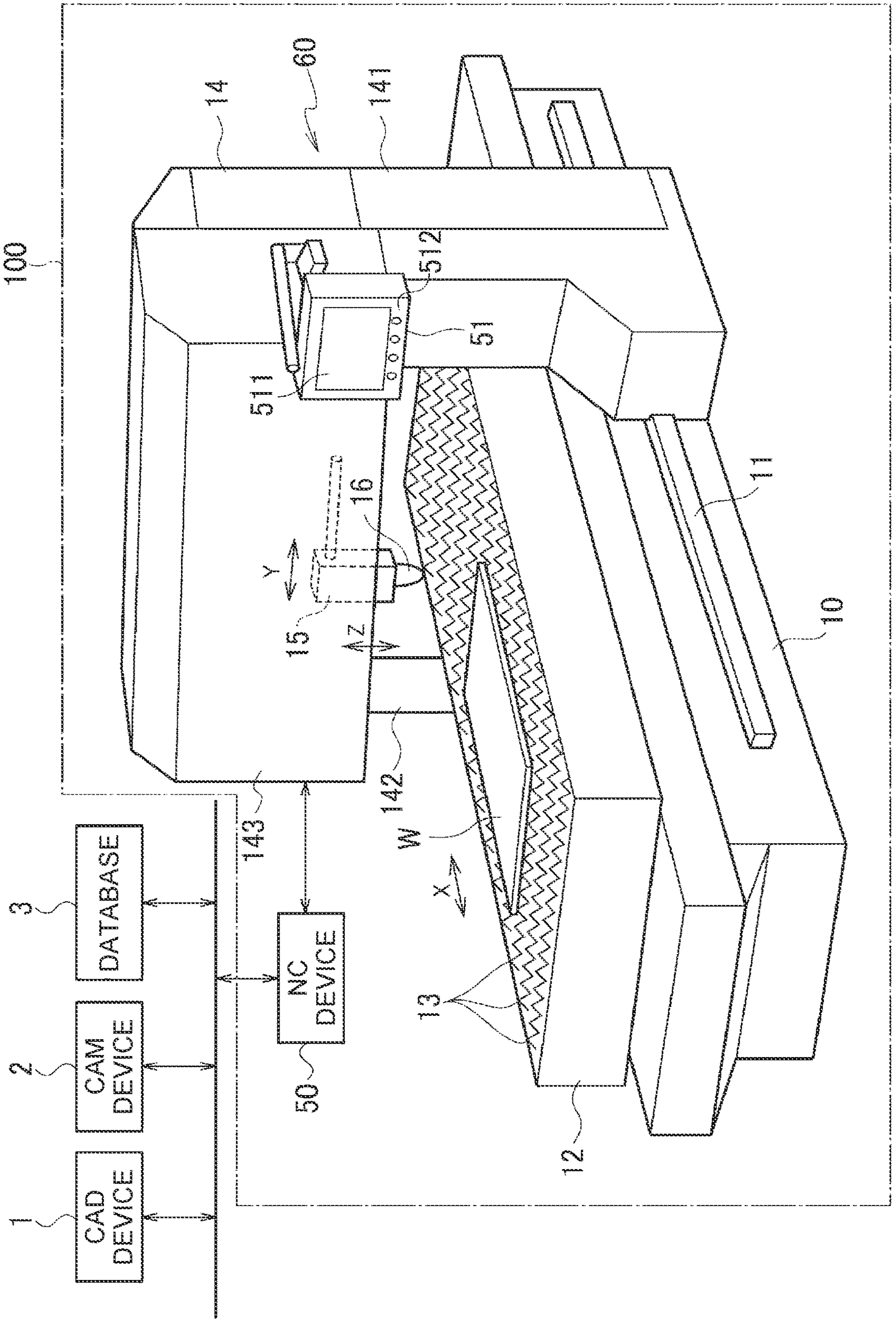
FIG. 1 is a diagram showing an overall configuration example of a laser processing machine of one or more embodiments.

First, with the use of FIG. 1, an overall configuration example of a laser processing machine 100 of the one or more embodiments will be described. In FIG. 1, a table 12 for placing a sheet metal W, which is a material to be processed, is provided on a base 10. In the table 12, a plurality of skids 13 made of iron plates, for example, are arranged in an X direction. A plurality of triangular protrusions are formed on the upper end portion of each of the skids 13. Therefore, the sheet metal W is supported by the plurality of protrusions.

The laser processing machine 100 includes a gate-shaped frame 14 arranged so as to straddle the table 12. The frame 14 includes side frames 141 and 142, and an upper frame 143. The frame 14 is configured to move in the X direction along rails 11 in the X direction formed on side surfaces of the base 10.

A carriage 15 that can move in a Y direction is provided in the upper frame 143. A processing head 16 that emits a laser beam is attached to the carriage 15. The processing head 16 is configured to arbitrarily move in the X and Y directions above the sheet metal W when the frame 14 is moved in the X direction and the carriage 15 is moved in the Y direction. The processing head 16 can also move in the Z direction.

The base 10, the table 12 on which the skids 13 are arranged, the frame 14, and the carriage 15 to which the processing head 16 is attached constitute a processing machine main body 60. An NC device 50 controls the processing machine main body 60. The NC device 50 is an example of a control device that controls the processing machine main body 60.

An operation pendant 51 connected to the NC device is attached to the frame 14. The operation pendant 51 includes a display unit 511 and an operation unit 512. The display unit 511 displays various types of information. The operation pendant 51 supplies various types of instruction signals to the NC device 50 when an operator operates the operation unit 512.

A CAD (Computer Aided Design) device 1, a CAM (Computer Aided Manufacturing) device 2, and a database 3 are connected to the NC device 50 via a network. The CAD device 1 and the CAM device 2 are configured by a computer device or computer devices. The CAD device 1 and the CAM device 2 may be configured by separate computer devices, or may be configured by one computer device. The CAD device 1 generates graphic data of a part manufactured by the laser processing machine 100. The CAM device 2 creates a processing program for the laser processing machine 100 to cut the sheet metal W and manufacture the part based on the graphic data of the part (and graphic data of the sheet metal). The CAM device 2 functions as a processing program creation device of the one or more embodiments.

The processing program may be supplied to the NC device 50 or may be supplied to the database 3 for storage. If the processing program is stored in the database 3, the NC device 50 reads the processing program corresponding to the part to be manufactured from the database 3. The NC device 50 controls the processing machine main body 60 based on the processing program.

The laser processing machine 100 (the processing machine main body 60) irradiates the sheet metal W with a laser beam while causing the processing head 16 to move in the X direction or the Y direction so as to cut the sheet metal W, and cuts out one or more parts from the sheet metal W. Note that an assist gas is blown onto the sheet metal W in accordance with the irradiation of the laser beam. In FIG. 1, an illustration of a configuration in which the assist gas is blown is omitted.

By taking, as a first example, the case in which the laser processing machine 100 manufactures a part P1 shown in FIG. 2, how the laser processing machine 100 preferably cuts the sheet metal W will be described. The part P1 is a part having one round hole and two oblong holes. A round hole is formed when the laser processing machine 100 cuts a hole processing line H1 in a circular shape, and oval holes are formed when the laser processing machine 100 cuts hole processing lines H2*a* and H2*b* each in an oval shape. The oval hole is a figure in which a circular arch in a semi-circular shape is connected to each end of two parallel straight lines of the same length. When the outer shape of the part P1 is cut after the laser processing machine 100 forms the round hole and the oval holes, the part P1 is cut out from the sheet metal W.

Figure 2:
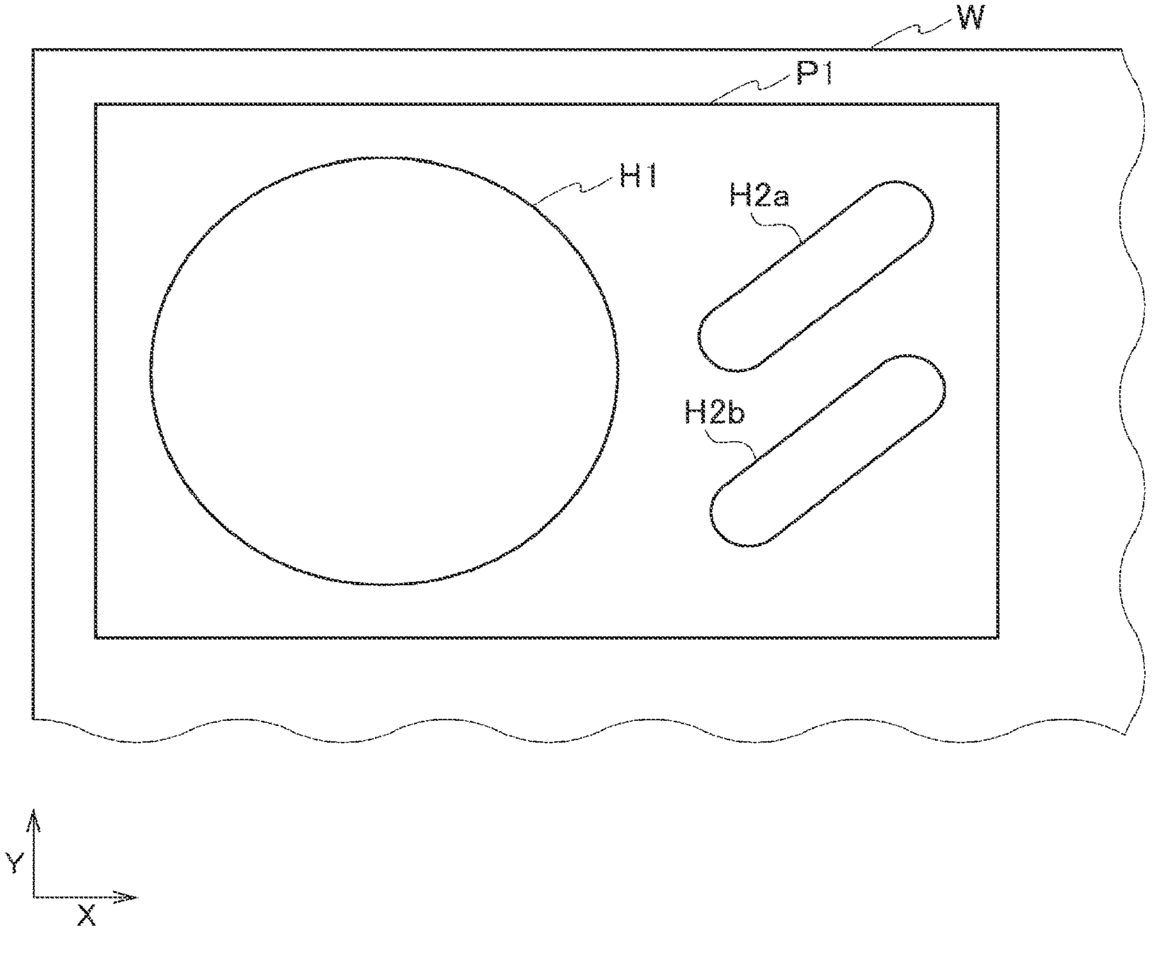
FIG. 2 is a plan view showing a first example of a part having a hole.

In FIG. 2, the X direction is a direction in which the plurality of skids 13 shown in FIG. 1 are arranged, and the Y direction is a direction along the plane of the skid 13 that is orthogonal to the X direction.

Figure 3:
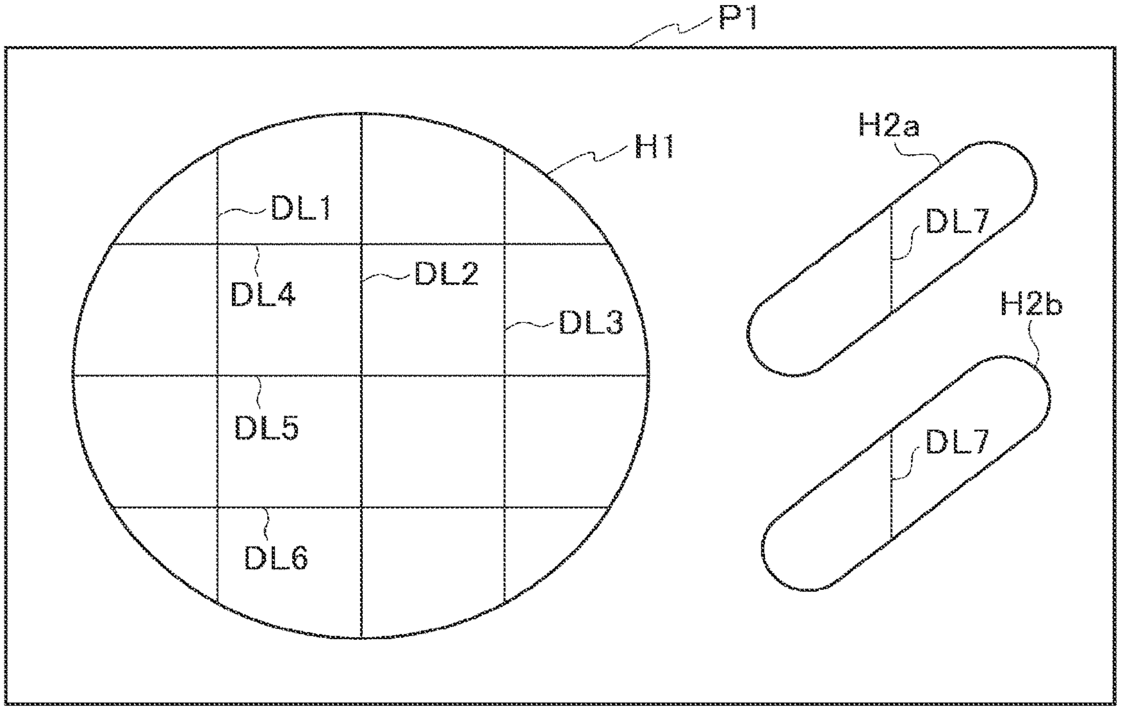
FIG. 3 is a plan view showing a state in which hole forming regions of the part shown in FIG. 2 are divided by at least one dividing line.

Since the round hole and the oval holes formed in the part P1 are relatively large holes, it is assumed, as shown in FIG. 3, that the laser processing machine 100 divides a hole forming region in the hole processing line H1 by a plurality of dividing lines, and divides hole forming regions in the hole processing lines H2*a* and H2*b* by one dividing line for each. The hole forming region in the hole processing line H1 is divided into 16 by dividing lines DL1 to DL3 in the Y direction and dividing lines DL4 to DL6 in the X direction. The hole forming regions in the hole processing lines H2*a* and H2*b* are divided into two by a dividing line DL7 in the Y direction. By dividing each of the hole forming regions in this manner, it is possible to prevent a scrap from being raised and cause the scrap to fall from between the skids 13.

It is also conceivable to divide the hole forming region in the hole processing line H1 into four only by the dividing line DL2 in the Y direction and the dividing line DL5 in the X direction. However, in the four divisions, the scrap may not fall or the scrap that has not fallen may be raised. The processing head 16 can interfere with the raised scrap, which may stop the processing or break the processing head 16. Therefore, as shown in FIG. 3, when a large hole is formed, it is preferable to divide the hole forming region by many dividing lines so as to make the scrap smaller.

Figure 4:
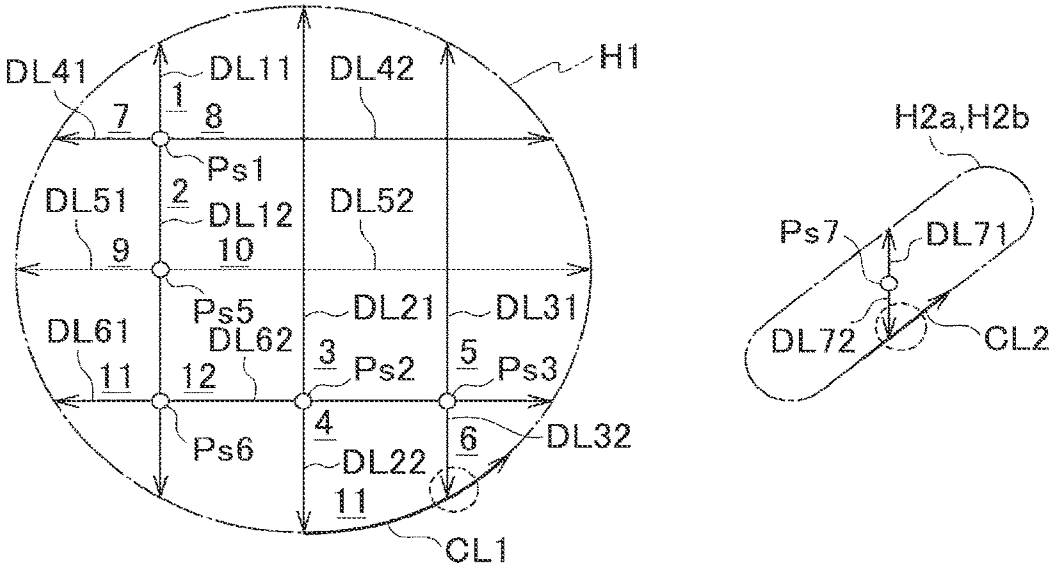
FIG. 4 is a diagram showing an example of a specific cutting process when the hole forming regions of the part shown in FIG. 2 are divided by the at least one dividing line shown in FIG. 3.

When the hole forming region in the hole processing line H1 and the hole forming regions in the hole processing lines H2*a* and H2*b* are divided by the dividing lines DL1 to DL7, the respective hole forming regions are cut specifically as shown in FIG. 4 as an example. In FIG. 4, underlined numbers indicate an example of a cutting process and an order thereof.

In FIG. 4, the laser processing machine 100 opens a pierced hole Ps1 in the hole forming region of the hole processing line H1, cuts the dividing line DL11 from the pierced hole Ps1 upward to the hole processing line H1, and subsequently cuts the dividing line DL12 from the pierced hole Ps1 downward to the hole processing line H1. The laser processing machine 100 further opens a pierced hole Ps2, cuts a dividing line DL21 from the pierced hole Ps2 upward to the hole processing line H1, and subsequently cuts a dividing line DL22 from the pierced hole Ps2 downward to the hole processing line H1. The laser processing machine 100 further opens a pierced hole Ps3, cuts a dividing line DL31 from the pierced hole Ps3 upward to the hole processing line H1, and subsequently cuts a dividing line DL32 from the pierced hole Ps3 downward to the hole processing line H1.

The laser processing machine 100 cuts a dividing line DL41 from the pierced hole Ps1 to the hole processing line H1 to the left, and subsequently cuts a dividing line DL42 from the pierced hole Ps1 to the hole processing line H1 to the right. The laser processing machine 100 further opens a pierced hole Ps5, cuts a dividing line DL51 from the pierced hole Ps5 to the hole processing line H1 to the left, and subsequently cuts a dividing line DL52 from the pierced hole Ps5 to the hole processing line H1 to the right. The laser processing machine 100 further opens a pierced hole Ps6, cuts a dividing line DL61 from the pierced hole Ps6 to the hole processing line H1 to the left, and subsequently cuts a dividing line DL62 from the pierced hole Ps6 to the hole processing line H1 to the right.

Finally, the laser processing machine 100 cuts the sheet metal W along the hole processing line H1 from any position on the hole processing line H1 to form a cutting line CL1. FIG. 4 shows the partial cutting line CL1 in a circular-arc shape before the circular cutting line along the hole processing line H1 is formed.

The laser processing machine 100 opens a pierced hole Ps7 in the hole forming region in the hole processing lines H2*a* and H2*b*, cuts a dividing line DL71 from the pierced hole Ps7 upward to the hole processing line H2*a* or H2*b*, and subsequently cuts a dividing line DL72 from the pierced hole Ps7 downward to the hole processing line H2*a* or H2*b*. Finally, the laser processing machine 100 cuts the sheet metals W along the hole processing line H2*a* or H2*b* from any position on the hole processing line H2*a* and H2*b* to form a cutting line CL2. FIG. 4 shows the partial cutting line CL2 before the oval cutting line along the hole processing line H2*a* or H2*b* is formed.

Figure 5:
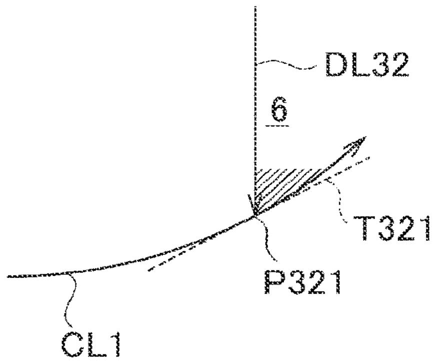
FIG. 5 is a partially enlarged view in FIG. 4 for explaining the reason why a processing defect occurs.

FIG. 5 shows, by enlargement, a periphery of a connecting point P321 (a first connecting point) at which the dividing line DL32 and the cutting line CL1 are connected to each other. When the cutting line CL1 passes the connecting point P321 and the cutting proceeds, from two angles formed by the dividing line DL32 and a tangent line T321 of the cutting line CL1 at the connecting point P321 before and after passing the connecting point P321, the angle after passing is smaller. Therefore, a heat more than necessary may be applied to a hatched portion. Then, burning may occur in which a metal is excessively molten, which may cause a processing defect in which the scrap does not fall.

An angle formed by the dividing line and the hole processing line H1 or H2 (the cutting line CL1 or CL2), or an angle formed by the dividing line and the tangent line of the hole processing line H1 or H2 at the connecting point at which the dividing line is connected to the hole processing line H1 or H2 will be referred to as a connection angle.

Figure 6:
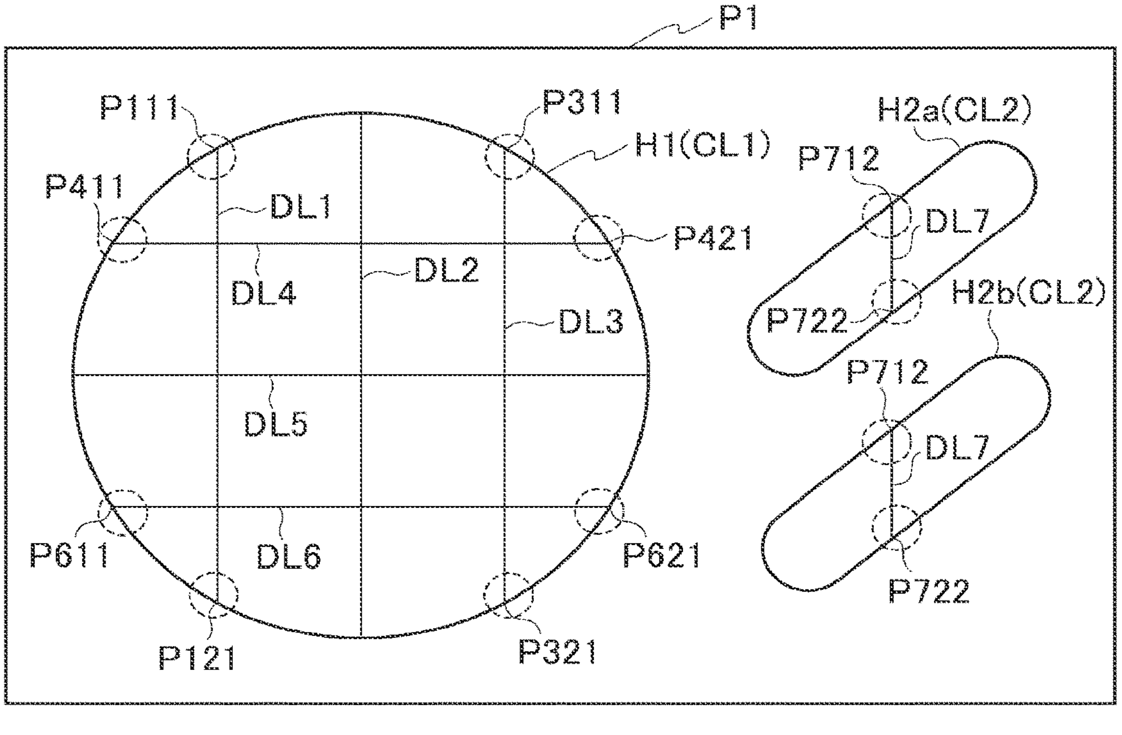
FIG. 6 is a plan view showing positions at which burning that causes the processing defect is likely to occur when the hole forming regions of the part are divided by the at least one dividing line as shown in FIG. 3.

As shown in FIG. 6, the burning is likely to occur, as surrounded by broken line circles, at connecting points P111, P121, P311, P411, P421, P611, and P621 in addition to the connecting point 321 in the hole forming region surrounded by the hole processing line H1, and at connecting points P712 and P722 in the hole forming region surrounded by the hole processing line H2*a* or H2*b*. At these connecting points, one connection angle of the two connection angles on both sides of the dividing line is smaller, which may cause the processing defect. The smaller connection angle will be referred to as a connection angle to be determined.

Figure 7:
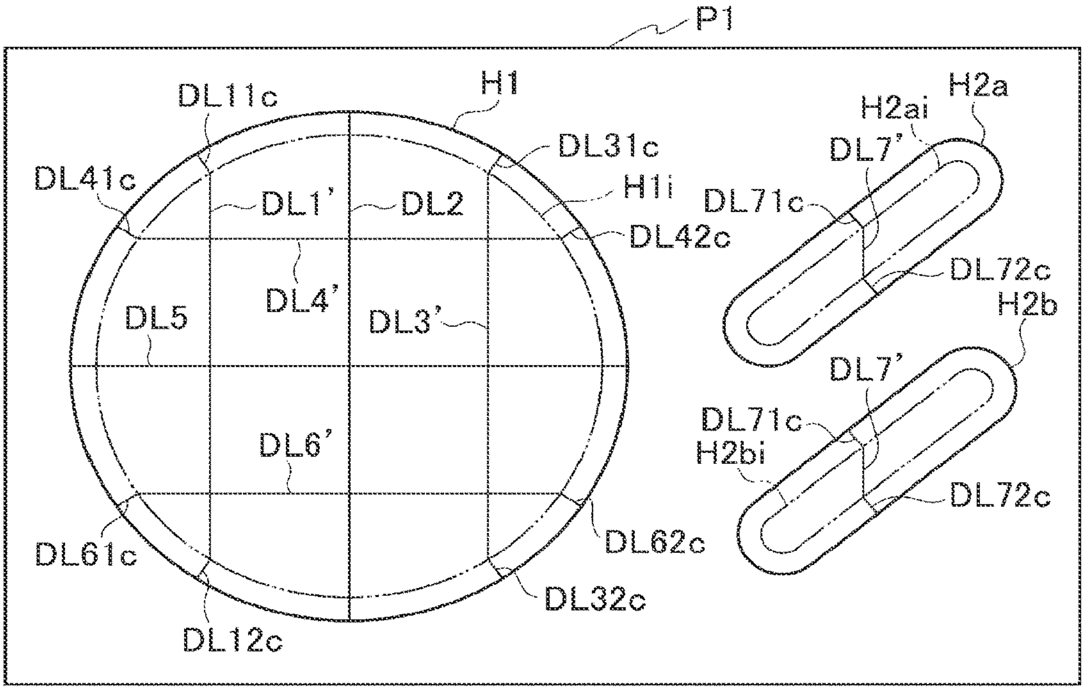
FIG. 7 is a plan view showing a state in which the hole forming regions of the part shown in FIG. 2 are divided by at least one dividing line including corrected dividing lines.

Therefore, in order to suppress an occurrence of the processing defect, in the laser processing machine 100 and the laser processing method executed by the laser processing machine 100 of the one or more embodiments, the dividing line is set as shown in FIG. 7 to cut the hole forming region. The processing program creation device of the one or more embodiments creates a processing program in which the dividing line for cutting the hole forming region as shown in FIG. 7 is set.

As shown in FIG. 7, the laser processing machine 100 divides the hole forming region surrounded by the hole processing line H1 with dividing lines DL1', DL3', DL4', DL6' in place of the dividing lines DL1, DL3, DL4, and DL6 shown in FIG. 3. The dividing lines DL1', DL3', DL4', and DL6' include corrected dividing lines DL11*c* and DL12*c*, DL31*c* and DL32*c*, DL41*c* and DL42*c*, and DL61*c* and DL62*c*, respectively, between a virtual circular auxiliary lines H1*i* set in the hole processing line H1 and the hole processing line H1. The dividing lines DL2 and DL5 are the same as those in FIG. 3.

The auxiliary line H1*i* is a line obtained by offsetting inward the hole processing line H1 by a predetermined distance. It is preferable that the hole processing line H1 and the auxiliary line H1*i* are concentric to each other. It is preferable that the shape of the auxiliary line H1*i* is similar to the shape of the hole processing line H1, but the shape thereof is not limited to being similar.

Further, the laser processing machine 100 divides the hole forming regions in the hole processing lines H2*a* and H2*b* by a dividing line DL7' in place of the dividing line DL7 shown in FIG. 3. The dividing line DL7' includes corrected dividing lines DL71*c* and DL72*c* between virtual oval auxiliary lines H2*ai* or H2*bi* set in the hole processing lines H2*a* and H2*b* and the hole processing lines H2*a* or H2*b*.

The auxiliary lines H2*ai* and H2*bi* are lines obtained by offsetting inward the hole processing lines H2*a* and H2*b* by a predetermined distance, respectively. It is preferable that the hole processing lines H2*a* and H2*b* and the auxiliary lines H2*ai* and H2*bi* have similar shapes and are concentric to each other. In other words, it is preferable that the center of a figure formed by the auxiliary lines H2*ai* and H2*bi* is arranged so as to coincide with the center of a figure formed by the hole processing lines H2*a* and H2*b*. The shapes of the two are not limited to being similar.

In this manner, the dividing lines DL1', DL3', DL4', DL6', and DL7' are bent at positions at which the dividing lines DL1, DL3, DL4, DL6, and DL7 intersect with the auxiliary lines H1*i*, H2*ai*, and H2*bi*, respectively.

Figure 8:
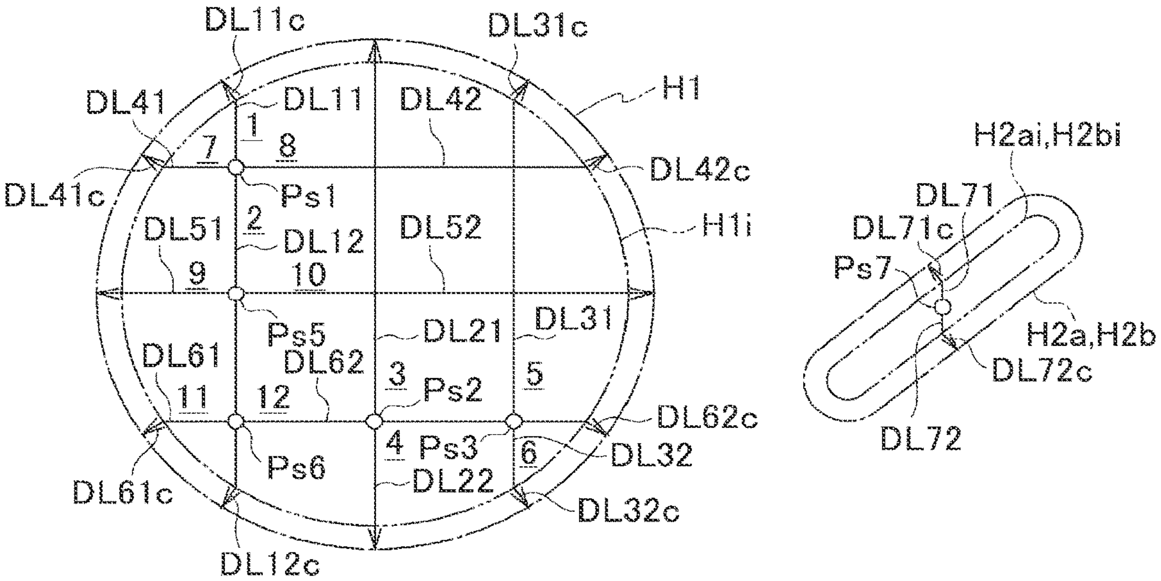
FIG. 8 is a diagram showing an example of a specific cutting process when the hole forming regions of the part shown in FIG. 2 are divided by the at least one dividing line including the corrected dividing lines shown in FIG. 7.

Specifically, the respective hole forming regions are cut as shown in FIG. 8 as an example. In FIG. 8, underlined numbers indicate an example of a cutting process and an order thereof. The description common to FIG. 4 will be omitted.

In FIG. 8, the laser processing machine 100 cuts the dividing line DL11 from the pierced hole Ps1 formed in the hole processing line H1 upward until reaching the auxiliary line H1*i*, and then cuts the corrected dividing line DL11*c* whose travelling direction is changed to the hole processing line H1. Subsequently, the laser processing machine 100 cuts the dividing line DL12 from the pierced hole Ps1 downward until reaching the auxiliary line H1*i*, and then cuts the corrected dividing line DL12*c* whose travelling direction is changed to the hole processing line H1.

The laser processing machine 100 cuts the dividing line DL31 from the pierced hole Ps3 formed in the hole processing line H1 upward until reaching the auxiliary line H1*i*, and then cuts the corrected dividing line DL31*c* whose travelling direction is changed to the hole processing line H1. Subsequently, the laser processing machine 100 cuts the dividing line DL32 from the pierced hole Ps3 downward until reaching the auxiliary line H1*i*, and then cuts the corrected dividing line DL32*c* whose travelling direction is changed to the hole processing line H1.

The laser processing machine 100 cuts the dividing line DL41 from the pierced hole Ps1 until reaching the auxiliary line H1*i* to the left, and then cuts the corrected dividing line DL41*c* whose travelling direction is changed to the hole processing line H1. Subsequently, the laser processing machine 100 cuts the dividing line DL42 from the pierced hole Ps1 until reaching the auxiliary line H1*i* to the right, and then cuts the corrected dividing line DL42*c* whose travelling direction is changed to the hole processing line H1.

The laser processing machine 100 cuts the dividing line DL61 from the pierced hole Ps6 formed in the hole processing line H1 to the left until reaching the auxiliary line H1*i*, and then cuts the corrected dividing line DL61*c* whose travelling direction is changed to the hole processing line H1. Subsequently, the laser processing machine 100 cuts the dividing line DL62 from the pierced hole Ps6 to the right until reaching the auxiliary line H1*i*, and then cuts the corrected dividing line DL62*c* whose travelling direction is changed to the hole processing line H1.

The laser processing machine 100 cuts the dividing line DL71 from the pierced hole Ps7 formed in the hole processing lines H2*a* and H2*b* upward until reaching the auxiliary line H2*ai* or H2*bi*, and then cuts the corrected dividing line DL71*c* whose travelling direction is changed to the hole processing line H2*a* or H2*b*. Subsequently, the laser processing machine 100 cuts the dividing line DL72 from the pierced holes Ps7 downward until reaching the auxiliary line H2*ai* or H2*bi*, and then cuts the corrected dividing line DL72*c* whose travelling direction is changed to the hole processing line H2*a* or H2*b*.

The corrected dividing lines DL11*c*, DL12*c*, DL31*c*, DL32*c*, DL41*c*, DL42*c*, DL61*c*, and DL62*c* correct the connection angle formed by the dividing line and the tangent line at the connecting point at which the dividing line and the hole processing line H1 (the cutting line CL1) are connected to each other. The corrected dividing lines DL71*c* and DL72*c* correct the connection angle formed by the dividing line and the tangent line at the connecting point at which the dividing line and the hole processing line H2*a* or H2*b* (the cutting line CL2) are connected to each other.

By the use of FIG. 9, how the corrected dividing lines DL11*c*, DL12*c*, DL31*c*, DL32*c*, DL41*c*, DL42*c*, DL61*c*, and DL62*c* correct the connection angle will be described by taking the corrected dividing lines DL32*c* and DL62*c* as an example. The dividing line DL32 that does not include the corrected dividing line DL32*c* is connected to the hole processing line H1 at the connecting point P321 as shown by a broken line. The connection angle to be determined (the connection angle before correction) at this time is much smaller than 90 degrees. The corrected dividing line DL32*c* is connected to the hole processing line H1 at a connecting point P321*c* (a second connecting point). A connection angle (a corrected connection angle) on the same side as the connection angle to be determined, which is formed by the corrected dividing line DL32*c* and a tangent line T321*c* of the hole processing line H1 at the connecting point P321*c*, is larger than the connection angle before correction.

Figure 9:
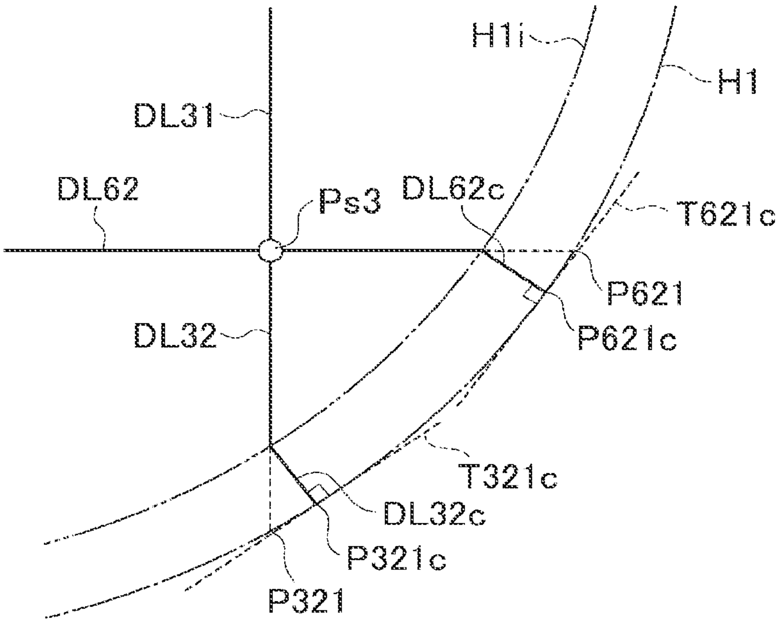
FIG. 9 is a partially enlarged view in FIG. 8 showing the details of the corrected dividing line when the corrected dividing line is assumed to be a straight line.

As shown in FIG. 9, the corrected connection angle at the connecting point P321*c* is preferably 90 degrees. It is necessary that the corrected connection angle is at least larger than the connection angle before correction. When the connection angle before correction is less than degrees, the corrected connection angle is preferably degrees or more. Even if the corrected connection angle is less than 90 degrees, the corrected connection angle may not be corrected when the angle is equal to or larger than a predetermined angle at which the burning does not occur.

The dividing line DL62 that does not include the corrected dividing line DL62*c* is connected to the hole processing line H1 at the connecting point P621 (a first connecting point) as shown by a broken line. The connection angle before correction at this time is much smaller than 90 degrees. The corrected dividing line DL62*c* is connected to the hole processing line H1 at a connecting point P621*c* (a second connecting point). A corrected connection angle formed by the corrected dividing line DL62*c* and a tangent line T621*c* of the hole processing line H1 at the connecting point P621*c* is larger than the connection angle before correction.

Similarly, the corrected connection angle at the connecting point P621*c* is preferably 90 degrees. It is necessary that the corrected connection angle is at least larger than the connection angle before correction. When the connection angle before correction is less than 45 degrees, the corrected connection angle is preferably 45 degrees or more. When the corrected connection angle is equal to or larger than a predetermined angle, the corrected connection angle may not be corrected.

Figure 10:
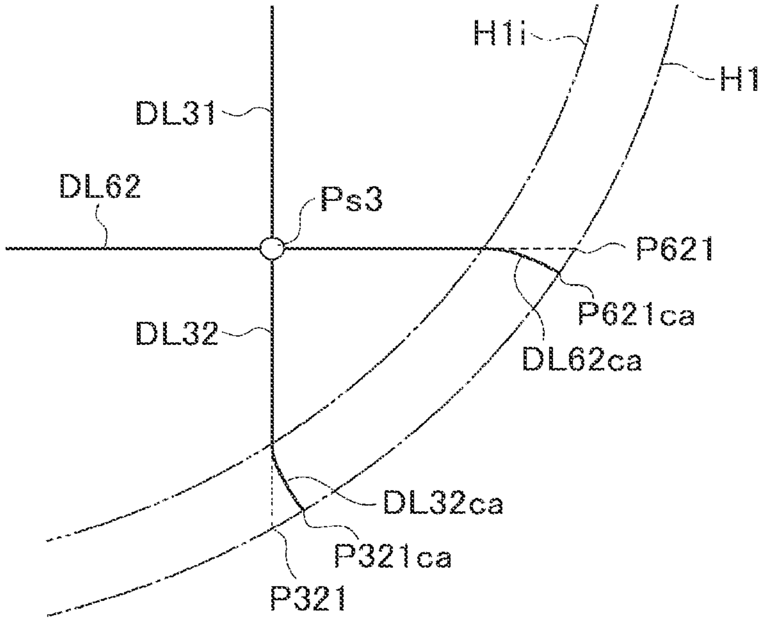
FIG. 10 is a partially enlarged view showing the details of the corrected dividing line when the corrected dividing line is assumed to be a curve.

The corrected dividing lines DL11*c* and DL12*c*, DL31*c* and DL32*c*, DL41*c* and DL42*c*, and DL61*c* and DL62*c* are not limited to straight lines, and may be curves that are circular arcs, for example. FIG. 10 shows an example in which corrected dividing lines DL32*ca* and DL62*ca* each formed of the circular arc are used in place of the corrected dividing lines DL32*c* and DL62*c* that are straight lines in FIG. 9, respectively. The corrected dividing lines DL32*ca* and DL62*ca* are connected to the hole processing line H1 at connecting points P321*ca* and P621*ca*, respectively. The corrected connection angle when the corrected dividing lines DL32*ca* and DL62*ca* are connected to the hole processing line H1 is larger than the connection angle before correction.

As described above, when the connection angle to be determined is smaller than the predetermined angle, the dividing line may be corrected such that line segments between the auxiliary lines H1*i*, H2*ai*, H2*bi* set in the hole forming regions and the hole processing lines H1, H2*a*, H2*b* are replaced with the corrected dividing lines each formed of the straight line or the curve, respectively. The corrected dividing line is the straight line (the line segment) or the curve from the position at which the dividing line intersects with the auxiliary line H1*i*, H2*ai*, or H2*bi* to the second connecting point that is different from the first connecting point.

Further, by taking, as a second example, the case in which the laser processing machine 100 manufactures a part P2 shown in FIG. 11, how the laser processing machine 100 preferably cuts the sheet metal W will be described. The part P2 is a part in which three holes having the same shape as each other are formed by cutting hole processing lines H3*a* to H3*c* having the shapes as shown in the figure. When the outer shape of the part P2 is cut after the laser processing machine 100 forms the three holes, the part P2 is cut out from the sheet metal W. The definitions of the X direction and the Y direction in FIG. 11 are the same as those in FIG. 2.

Figure 11:
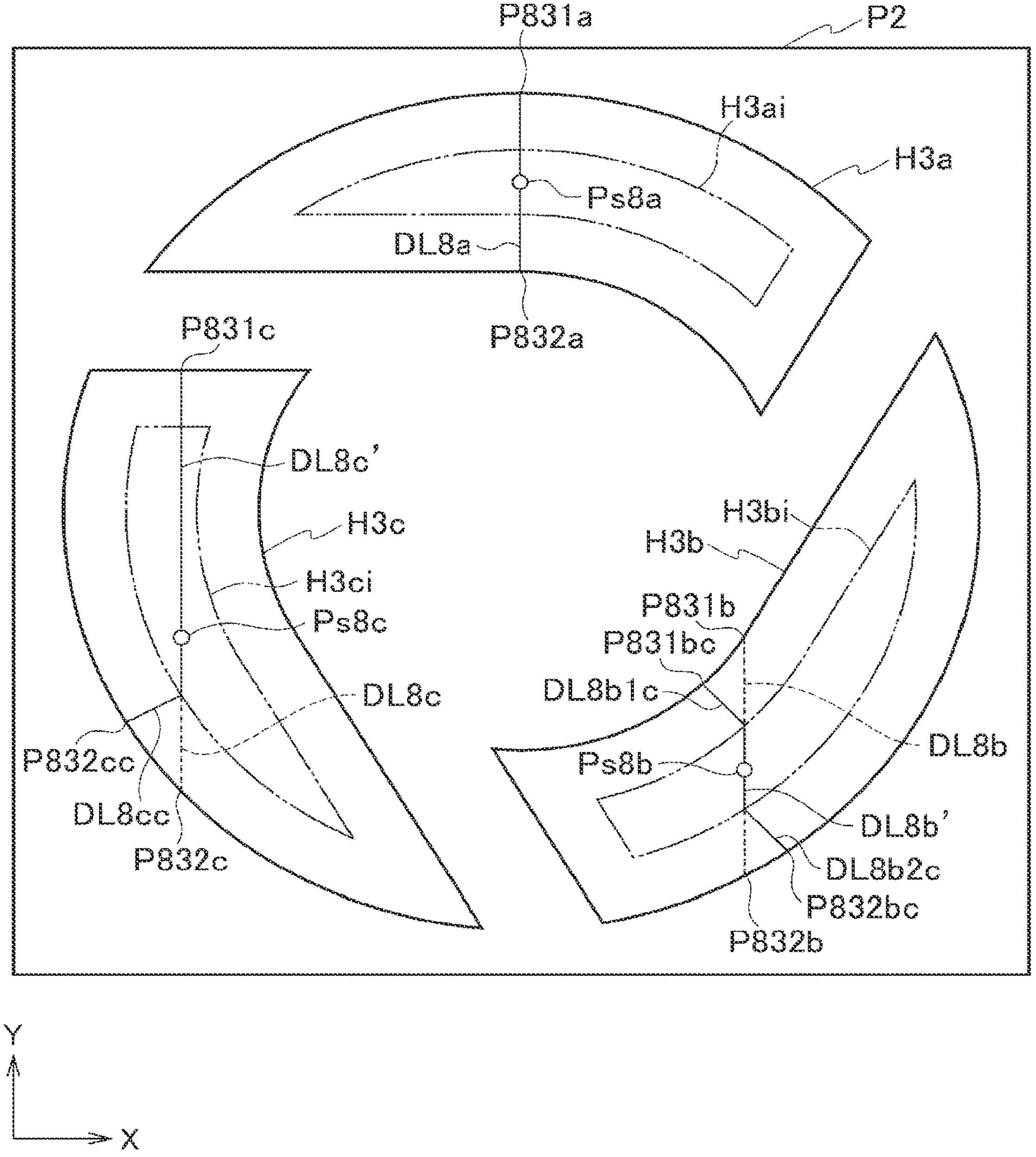
FIG. 11 is a plan view showing a second example of the part having a hole.

As shown in FIG. 11, it is assumed that the laser processing machine 100 divides hole forming regions surrounded by the hole processing lines H3*a* to H3*c* with dividing lines DL8*a*, DL8*b*, and DL8*c* in a single straight line shape each including a broken line portion, respectively. Then, the connection angle to be determined is smaller at both of connecting points P831*b* and P832*b* at which the dividing line DL8*b* and the hole processing line H3*b* are connected to each other. Further, the connection angle to be determined is smaller at a connecting point P832*c* at which the dividing line DL8*c* and the hole processing line H3*c* are connected to each other.

Therefore, in order to suppress the occurrence of the processing defect, in the laser processing machine 100 and the laser processing method executed by the laser processing machine 100 of the one or more embodiments, a dividing line is set as shown in FIG. 11 to cut a hole forming region. The processing program creation device of the one or more embodiments creates a processing program in which the dividing line for cutting the hole forming region is set as shown in FIG. 11.

As shown in FIG. 11, virtual auxiliary lines H3*ai* to H3*ci* obtained by offsetting inward the hole processing lines H3*a* to H3*c* are set in the hole forming regions in the hole processing lines H3*a* to H3*c*, respectively, as shown by the alternate long and short dash lines. The laser processing machine 100 cuts the hole forming regions surrounded by the hole processing lines H3*b* and H3*c* with dividing lines DL8*b*' and DL8*c*' shown by the solid lines, respectively. The dividing line DL8*b*' includes corrected dividing lines DL8*b*1*c* and DL8*b*2*c* between the auxiliary line H3*bi* and the hole processing line H3*b*. The dividing line DL8*c*' includes a corrected dividing line DL8*cc* between the auxiliary line H3*ci* and the hole processing line H3*c*. The dividing line DL8*a* for dividing the hole forming region surrounded by the hole processing line H3*a* does not need to be corrected and thus does not include a corrected dividing line.

When the laser processing machine 100 divides the hole forming region surrounded by the hole processing line H3*b* with the dividing line DL8*b*', the dividing line DL8*b*' is connected to the hole processing line H3*b* at connecting points P831*bc* and P832*bc*. The corrected connection angles of the corrected dividing lines DL8*b*1*c* and DL8*b*2*c* at the connecting points P831*bc* and P832*bc* are 90 degrees, respectively. When the laser processing machine 100 divides the hole forming region surrounded by the hole processing line H3*c* with the dividing line DL8*c*', the dividing line DL8*c*' is connected to the hole processing line H3*c* at a connecting point P832*cc*. The corrected connection angle of the corrected dividing line DL8*cc* at the connecting point P832*cc* is 90 degrees.

It is preferable that the shapes of the auxiliary lines H3*ai* to H3*ci* are respectively similar to the shapes of the hole processing lines H3*a* to H3*c*, but they may not be similar. The auxiliary lines H3*ai* to H3*ci* may be set at positions separated inward from the hole processing lines H3*a* to H3*c* by a predetermined distance. It is preferable that the predetermined distance is a fixed distance, but it does not have to be a fixed distance.

In FIG. 11, in the hole forming region surrounded by the hole processing line H3*a*, the laser processing machine 100 cuts the dividing line DL8*a* from a pierced hole Ps8*a* to, for example, a connecting point P831*a* and subsequently, cuts the dividing line DL8*a* from the pierced hole Ps8*a* in an opposite direction to the connecting point P832*a*. In the hole forming region in the hole processing line H3*b*, the laser processing machine 100 cuts the dividing line DL8*b*' from a pierced hole Ps8*b* until reaching the auxiliary line H3*bi*, and then cuts the corrected dividing line DL8*b*1*c* up to the connecting point P831*bc*. Subsequently, the laser processing machine 100 cuts the dividing line DL8*b*' from the pierced hole Ps8*b* in the opposite direction until reaching the auxiliary line H3*bi*, and then cuts the corrected dividing line DL8*b*2*c* up to the connecting point P832*bc*.

The laser processing machine 100 cuts the dividing line DL8*c*' from a pierced hole Ps8*c* to, for example, a connecting point P831*c* in the hole forming region surrounded by the hole processing line H3*c*. Subsequently, the laser processing machine 100 cuts the dividing line DL8*c*' from the pierced hole Ps8*c* in the opposite direction until reaching the auxiliary line H3*ci*, and then cuts the corrected dividing line DL8*cc* up to the connecting point P832*cc*.

Figure 12:
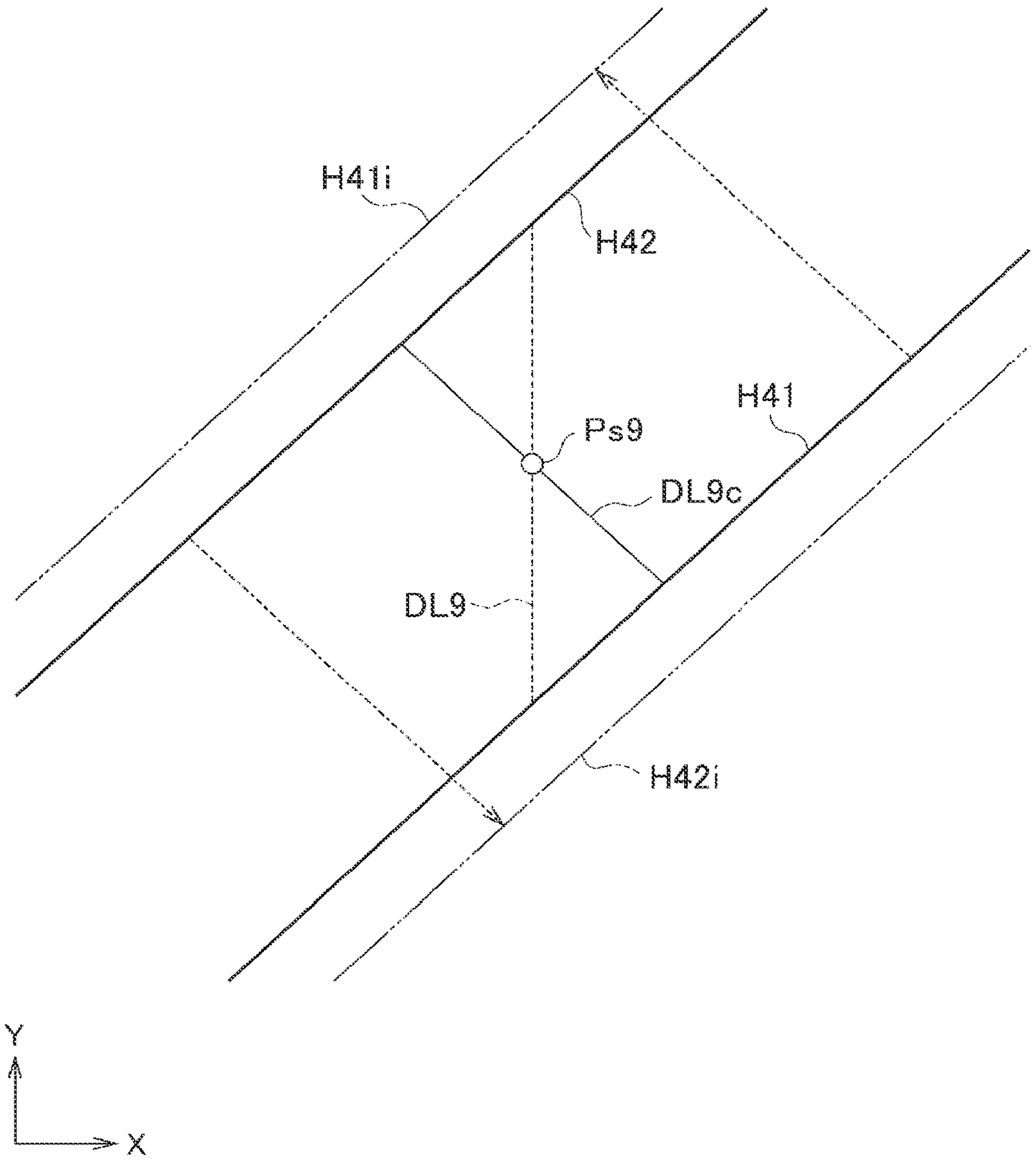
FIG. 12 is a partially enlarged view showing a method of setting the corrected dividing line when an offset line is not able to be set in the hole forming region.

FIG. 12 shows a case in which two hole processing lines H41 and H42 parallel to each other are located at a short distance. In such a case, auxiliary lines H41*i* and H42*i* obtained by respectively offsetting inward the hole processing lines H41 and H42 may be located outside of the hole forming regions surrounded by the hole processing lines H41 and H42. When the auxiliary lines H41*i* and H42*i* are located outside of the hole forming regions, the dividing line DL9 shown by the broken line does not intersect with the auxiliary lines H41*i* and H42*i*. As a result, the corrected dividing line cannot be set by the same method as in FIGS. 7 and 11.

Therefore, in the laser processing machine 100 and the laser processing method executed by the laser processing machine 100 of the one or more embodiments, a corrected dividing line DL9*c* is set as shown in FIG. 12 to cut the hole forming region. The processing program creation device of the one or more embodiments creates a processing program in which a corrected dividing line for cutting the hole forming region is set as shown in FIG. 12.

The laser processing machine 100 cuts a hole forming region by the corrected dividing line DL9*c* shown by the solid line, which is orthogonal to the hole processing lines H41 and H42. The laser processing machine 100 cuts the corrected dividing line DL9*c* from a pierced hole Ps9 formed between the hole processing lines H41 and H42 until reaching, for example, the hole processing line H41, and subsequently cuts the corrected dividing line DL9*c* from the pierced hole Ps9 until reaching the hole processing line H42.

Figure 13:
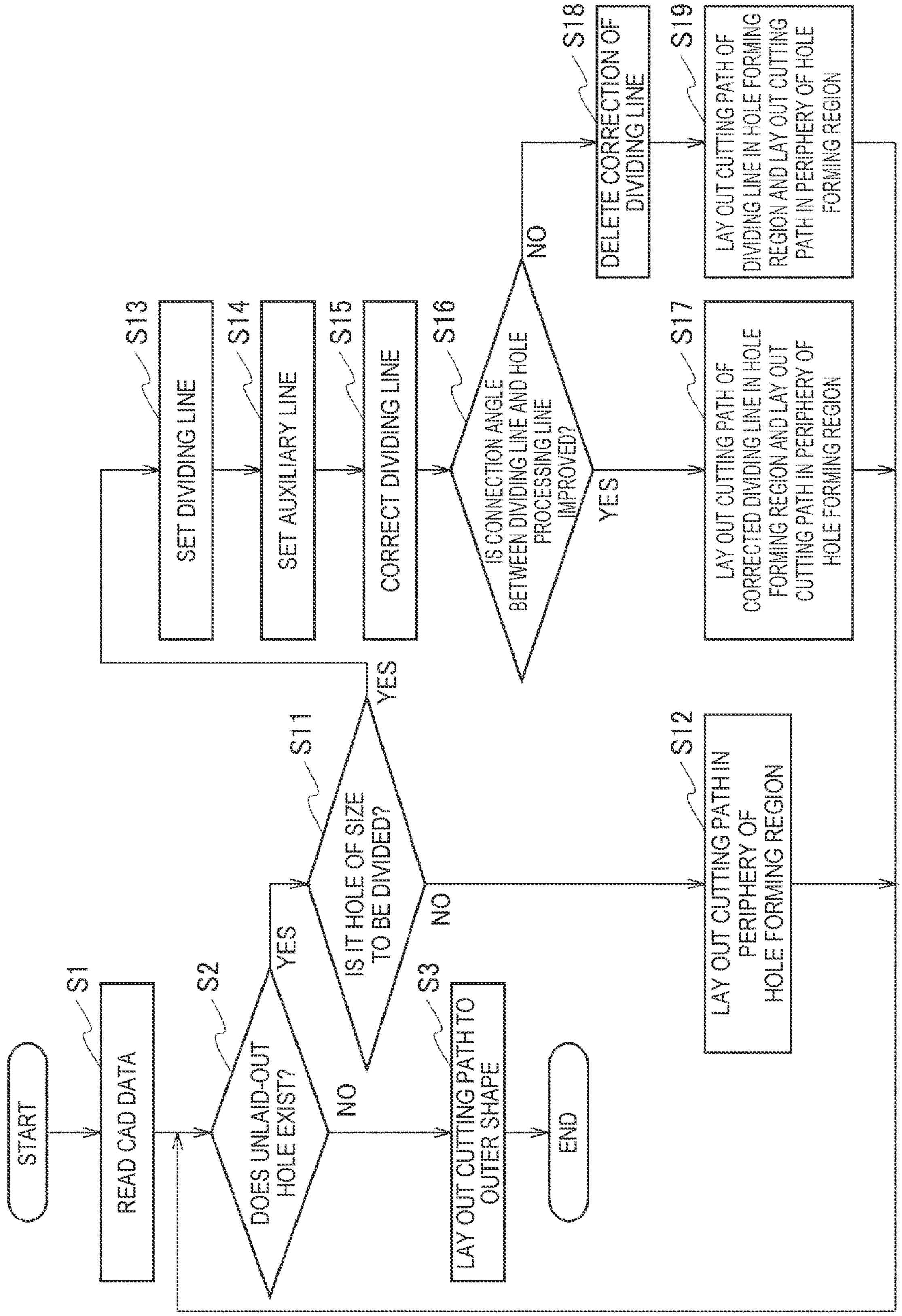
FIG. 13 is a flowchart showing processing in which a processing program creation device of the one or more embodiments creates a processing program.

By using a flowchart shown in FIG. 13, processing in which the processing program creation device of the one or more embodiments creates the processing program will be described. In FIG. 13, when the processing is started, the CAM device 2 reads CAD data including the graphic data of the part in step S1. In step S2, the CAM device 2 determines whether or not there is an unlaid-out hole to which a cutting path has not been laid out. If there is no unlaid-out hole (NO), the CAM device 2 lays out the cutting path to the outer shape of the part in step S3, and ends the processing.

If there is the unlaid-out hole in step S2 (YES), the CAM device 2 determines in step S11 whether or not the unlaid-out hole is a hole of a size to be divided. If the unlaid-out hole is not the hole of a size to be divided (NO), the CAM device 2 lays out the cutting path in a periphery (the hole processing line) of the hole (the hole forming region) in step S12 and returns the processing to step S2.

If the unlaid-out hole is a hole of a size to be divided in step S11 (YES), the CAM device 2 sets the dividing line in the hole forming region in step S13. Specifically, the CAM device 2 sets at least one dividing line along the X direction or the Y direction in accordance with the size of the hole and a maximum size of the scrap. The CAM device 2 sets the auxiliary line in the hole forming region in step S14, and corrects the dividing line in step S15 as described in FIG. 7 or FIG. 11.

The CAM device 2 determines in step S16 whether or not the connection angle between the dividing line and the hole processing line has been improved. If | 90 degrees−connection angle before correction |≥| 90 degrees−corrected connection angle | is established in the connection angle on the same side as the connection angle to be determined before correction of the two connection angles on both sides of the dividing line, the connection angle has been improved. If the connection angle has been improved (YES), in step S17, the CAM device 2 lays out a cutting path of the corrected dividing line in the hole forming region, lays out the cutting path for forming the hole in the periphery of the hole forming region, and returns the processing to step S2.

If | 90 degrees−corrected connection angle |>| 90 degrees−connection angle before correction | is established in the connection angle on the same side as the connection angle to be determined before correction of the two connection angles on both sides of the dividing line, the connection angle has not been improved. If the connection angle has not been improved in step S16 (NO), the CAM device 2 deletes the correction of the dividing line in step S18. Subsequently, in step S19, the CAM device 2 lays out a cutting path of the dividing line in the hole forming region, lays out the cutting path for forming the hole in the periphery of the hole forming region, and returns the processing to step S2.

Figure 14:
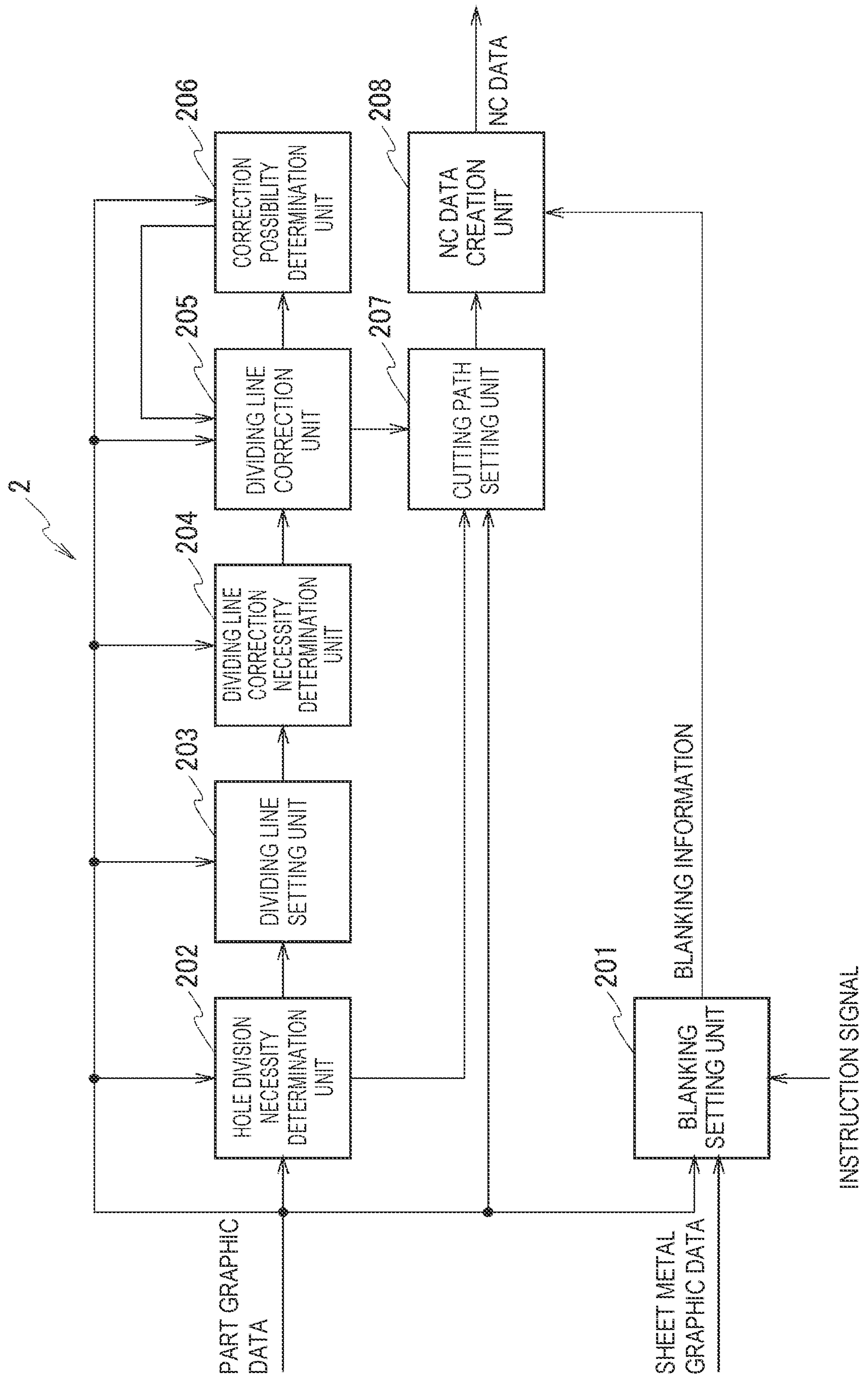
FIG. 14 is a block diagram showing a functional configuration example of a CAM device that creates the processing program.

FIG. 14 shows a functional configuration example of the CAM device 2 that generates the processing program. The CAM device 2 is equipped with a functional configuration as shown in FIG. 14 by executing CAM software (a computer program).

In FIG. 14, a blanking setting unit 201 executes blanking based on the graphic data of the part to be manufactured (hereinafter, the part graphic data) and the graphic data of the sheet metal W (hereinafter, the sheet metal graphic data), so as to generate blanking information. The blanking setting unit 201 executes the blanking so as to arrange a number of parts indicated by an instruction signal, which is instructed by operating an unillustrated operation unit, in a figure that indicates the sheet metal W. The part graphic data and the sheet metal graphic data may be supplied from the CAD device 1 to the CAM device 2, or may be read from the database 3 and supplied to the CAM device 2.

A hole division necessity determination unit 202 determines whether or not the hole needs to be divided by the dividing line based on the part graphic data when the part to be manufactured includes the hole. When the hole needs to be divided by the dividing line, a dividing line setting unit 203 sets at least one dividing line in the hole forming region based on the part graphic data. Based on the part graphic data, a dividing line correction necessity determination unit 204 determines whether or not the connection angle when the dividing line is connected to the hole processing line is small and thus the dividing line needs to be corrected to increase the connection angle.

When the dividing line needs to be corrected, a dividing line correction unit 205 sets the corrected dividing line based on the part graphic data so as to correct the dividing line. A correction possibility determination unit 206 determines whether or not the connection angle has been actually improved by the dividing line corrected by the dividing line correction unit 205 based on the part graphic data. As described above, the correction possibility determination unit 206 determines whether or not the relation of | 90 degrees−connection angle before correction |≥| 90 degrees−corrected connection angle | is satisfied, and determines that the connection angle has been improved if the relations is satisfied. The correction possibility determination unit 206 determines that the connection angle has not been improved if the relation is not satisfied. The connection angle before correction is the connection angle to be determined.

If the connection angle has not been improved, the correction possibility determination unit 206 instructs the dividing line correction unit 205 to delete the correction of the dividing line. When the deletion of the correction of the dividing line is instructed, the dividing line correction unit 205 deletes the correction of the dividing line and returns the diving line to the original dividing line set by the dividing line setting unit 203. The configuration may be the one in which the correction possibility determination unit 206 is not provided, but the configuration in which the correction possibility determination unit 206 is provided is preferable.

When the hole needs to be divided by the dividing line, a cutting path setting unit 207 lays out the cutting path of the dividing line in the hole forming region based on the part graphic data and the dividing line lastly set by the dividing line correction unit 205, and lays out the cutting path for forming the hole in the periphery of the hole forming region. When the hole does not need to be divided by the dividing line, the cutting path setting unit 207 lays out only the cutting path for forming the hole in the periphery of the hole forming region.

The flowchart shown in FIG. 13 shows the processing executed by the hole division necessity determination unit 202 to the cutting path setting unit 207 described above.

An NC data creation unit 208 creates NC data for controlling the laser processing machine 100 so that the NC device 50 cuts the sheet metal W to manufacture one or more parts based on the blanking information and the cutting path set by the cutting path setting unit 207. The NC data is a processing program configured by a machine control code for the NC device 50 to control the laser processing machine 100.

The present invention is not limited to the one or more embodiments described above, and various modifications can be made in a scope that does not depart from the summary of the present invention. In the one or more embodiments, the hole forming region is cut along the dividing line parallel to the X direction or the Y direction that is set in the hole forming region and the hole forming region is divided into the plurality of scraps. However, how the hole forming region is divided is not limited. In addition, how the skid 13 is arranged or the configuration of the skid 13 is not limited to the configuration example shown in FIG. 13.

The present application claims priority based on Japanese Patent Application No. 2020-196669 filed with the Japan Patent Office on Nov. 27, 2020, and all the disclosure contents thereof are incorporated herein by reference.

The invention claimed is:

1. A laser processing method, comprising:

setting at least one dividing line formed of a straight line in a hole forming region around which a hole processing line for forming a hole in a part manufactured by cutting a sheet metal is set so that the hole forming region is surrounded by the hole processing line;

defining, as a connection angle of the dividing line, an angle formed by the dividing line and the hole processing line at a first connecting point at which the dividing line is connected to the hole processing line or an angle formed by the dividing line and a tangent line of the hole processing line at the first connecting point, and defining a smaller connection angle of two connection angles on both sides of the dividing line as a connection angle to be determined, so as to determine whether or not the connection angle to be determined is smaller than a predetermined angle;

correcting the dividing line, when the connection angle to be determined is smaller than the predetermined angle, such that a line segment, of the dividing line, between an auxiliary line, which is obtained by offsetting inward the hole processing line by a predetermined distance and is set in the hole forming region, and the hole processing line is replaced with a corrected dividing line formed of a straight line or a curve from a position at which the dividing line intersects with the auxiliary line to a second connecting point connected to the hole processing line that is different from the first connecting point;

defining, as a connection angle of the corrected dividing line, an angle formed by the corrected dividing line and the hole processing line at the second connecting point or an angle formed by the corrected dividing line and a tangent line of the hole processing line at the second connecting point, and defining, as a corrected connection angle, an connection angle on a same side as the connection angle to be determined of two connection angles on both sides of the corrected dividing line, so as to set the corrected dividing line such that the corrected connection angle is larger than the connection angle to be determined; and performing irradiation of a laser beam along at least one dividing line including at least the corrected dividing line so as to divide the hole forming region into a plurality of scraps, and performing irradiation of the laser beam along the hole processing line so as to cut the hole forming region and to form the hole on the sheet metal.

2. The laser processing method according to claim 1, wherein the corrected connection angle is 45 degrees or more when the connection angle to be determined is less than 45 degrees; and the corrected connection angle is an angle larger than the connection angle to be determined when the connection angle to be determined is 45 degrees or more.

3. The laser processing method according to claim 1, wherein a shape of the auxiliary line is similar to and has a same center as a shape of the hole processing line.

* * * * *